United States Patent [19]

Takeda

[11] Patent Number: 5,158,392
[45] Date of Patent: Oct. 27, 1992

[54] ARRANGEMENT FOR MOUNTING PANEL ASSEMBLIES ON A BUILDING

[75] Inventor: Akihiko Takeda, Tokyo, Japan
[73] Assignee: Yoshida Kogyo K. K., Tokyo, Japan
[21] Appl. No.: 604,368
[22] Filed: Oct. 25, 1990

Related U.S. Application Data

[63] Continuation of Ser. No. 496,120, Mar. 19, 1990, abandoned, which is a continuation of Ser. No. 386,611, Jul. 31, 1989, abandoned.

[30] Foreign Application Priority Data

Aug. 3, 1988 [JP] Japan .................... 63-10235[U]

[51] Int. Cl.$^5$ .............................................. E04H 1/00
[52] U.S. Cl. ............................... 403/405.1; 403/403; 52/235
[58] Field of Search ............ 403/403, 405.1, 335–337, 403/375, 382, 407.1; 52/235, 391, 489, 486, 573, 513

[56] References Cited

U.S. PATENT DOCUMENTS

| | | | |
|---|---|---|---|
| 2,175,453 | 10/1939 | Barcy | 403/405.1 |
| 3,742,667 | 7/1973 | Tofani, Jr. | 52/235 |
| 4,546,582 | 10/1985 | Gartner | 52/235 |
| 4,565,040 | 1/1986 | Kaminaga | 52/235 |
| 4,662,135 | 5/1987 | Tanikawa et al. | 52/235 |
| 4,782,635 | 11/1988 | Hegle | 52/235 X |

FOREIGN PATENT DOCUMENTS 1440784 6/1976 United Kingdom .................. 52/235

Primary Examiner—Peter M. Cuomo
Assistant Examiner—Franco S. De Liguori
Attorney, Agent, or Firm—Hill, Van Santen, Steadman & Simpson

[57] ABSTRACT

An arrangement for mounting panel assemblies on a building body including a primary fastener fixedly secured to the building body, a secondary fastener connected with the primary fastener in such a manner that its position may be adjusted in a direction perpendicular to the building body, a height adjusting plate fixedly secured to the secondary fastener in such a manner that its vertical position may be adjusted, and mounting brackets fixedly secured to rear surfaces of the panel assemblies, wherein the mounting brackets and the secondary fastener are interconnected so that the mounting brackets are allowed to abut against the height adjusting plate, and wherein the mounting brackets are allowed to abut against the secondary fastener.

3 Claims, 6 Drawing Sheets

ARRANGEMENT FOR MOUNTING PANEL ASSEMBLIES ON A BUILDING

This is a continuation of application Ser. No. 07/496,120, filed Mar. 19, 1990, now abandoned, which is a continuation of application Ser. No. 07/386,611, filed Jul. 31, 1989, now abandoned.

BACKGROUND OF THE INVENTION

1. Field of the Invention

This invention relates to an arrangement for mounting panel assemblies forming a curtain wall on the body of a building.

2. Description of the Prior Art

In general, a curtain wall forms an external wall of a building by mounting panel assemblies on the building body, and the panel assemblies are mounted on the building body by means of fasteners.

For example, an L-shaped fastener is fixedly secured to the body of a building, a secondary fastener is secured to the primary fastener by means of bolts, and the secondary fastener is fixedly secured to panel assemblies, thereby mounting the panel assemblies on the building body.

In such a mounting arrangement, since the panel assembly mounting position is adjusted by adjusting the position of the secondary fastener relative to the primary fastener in the direction perpendicular to the building body, and moving the panel assemblies relative to the secondary fastener in the vertical direction and the transverse direction parallel to the building body, the mounting operation itself becomes very troublesome.

Further, since the secondary fastener is fixedly secured to the panel assemblies by means of bolts so as to press the wide surface of the secondary fastener against the panel assemblies, the area of the secondary fastener which is pressed against the panel assemblies becomes wide, and if the secondary fastener is inclined, or the surface of the secondary fastener, which is kept in contact with the panel assemblies, or the surfaces of the panel assemblies in or are uneven, then it becomes impossible sometimes to mount the panel assemblies vertically on the building body.

SUMMARY OF THE INVENTION

The present invention has been made in view of the above-mentioned circumstances in the prior art, and has for its object to provide an arrangement for mounting panel assemblies on the body of a building, which enables the mounting position of the panel assemblies on the building body to be adjusted in directions perpendicular to the building body and in the vertical direction and which enables the panel assembly mounting operation to be carried out simply and readily.

Another object of the present invention is to provide an arrangement for mounting panel assemblies on the body of a building whereby a vertical position of the panel assemblies can be achieved readily.

To achieve the above-mentioned objects, according to the first aspect of the present invention, there is provided an arrangement for mounting panel assemblies on the body of a building comprising: (a) a primary fastener fixedly secured to a slab of the building body by means of bolts; (b) a secondary faster connected with the primary fastener through horizontal pieces thereof in such a manner that its position may be adjusted in directions perpendicular to the building surface; (c) a height adjusting plate having an upper part of a circular-arc shaped, or rounded, in vertical section and fixedly secured to a vertical piece of the secondary fastener in such a manner that its vertical position may be adjusted; and (d) mounting brackets fixedly secured to rear surfaces of the panel assemblies, each of the mounting brackets including a vertical plate portion having a projection of a circular-arc shaped vertical section formed substantially in the intermediate portion thereof on the side of the building body, and a horizontal plate portion integrally formed with and projecting from the upper part of the vertical plate portion towards the building body, the horizontal plate portion having a downwardly bent piece formed integrally therewith at the leading end thereof, wherein the mounting brackets and the secondary fastener are interconnected so that the lower surfaces of the horizontal plate portions of the mounting brackets are allowed to abut against the rounded upper portion of the height adjusting plate, and wherein the circular-arc shaped projections of the mounting brackets are allowed to abut against the vertical piece of the secondary fastener thereby mounting the panel assemblies on the building body.

To achieve the above-mentioned objects, according to the second aspect of the present invention, there is provided an arrangement for mounting panel assemblies on the body of a building as set forth in the above-mentioned first aspect, wherein the secondary fastener is comprised of a long member having an L-shaped section, whose horizontal piece has bolt insertion holes formed therethrough and extending in the direction at right angles to the surface of the building body, and whose vertical piece has elongated bolt insertion holes formed therethrough and extending in the vertical direction.

To achieve the above-mentioned objects, according to the present invention, there is provided an arrangement for mounting panel assemblies on the body of a building as set forth in the first aspect, wherein the vertical piece of the secondary fastener is applied with a washer at a position where the circular-arc shaped projections of each of the mounting brackets is allowed to abut against the secondary fastener.

The above-mentioned and other objects, aspects and advantages of the present invention will become apparent to those skilled in the art by making reference to the following detailed description and the accompanying drawings in which preferred embodiments incorporating the principles of the present invention are shown by way of examples only.

BRIEF DESCRIPTION OF ACCOMPANYING DRAWINGS

DETAILED DESCRIPTION OF PREFERRED EMBODIMENTS

The present invention will now be described below by way of several embodiments thereof as shown in the accompanying drawings.

Figure 6:
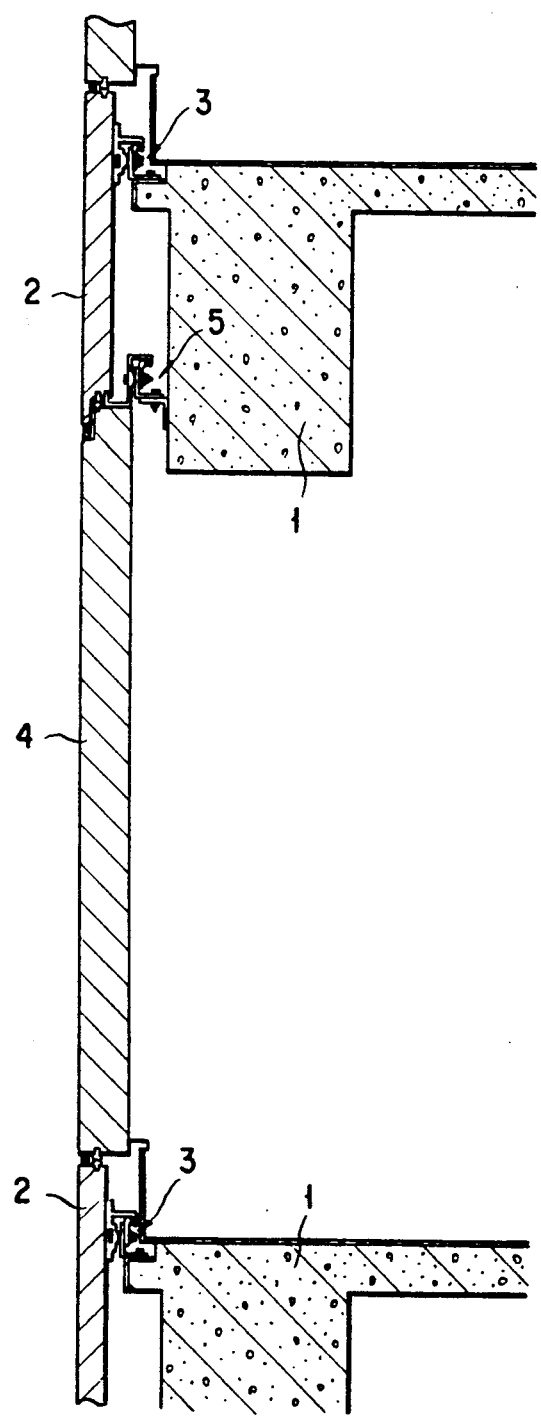
FIG. 6 is a schematic, vertical sectional view showing mounting condition of the first and second panels.

As shown in FIG. 6, each of first panel assemblies 2 is mounted on the front surface of each of slabs 1 of a building body by means of first fastener means 3. A second panel assembly 4 is mounted by second fastener means 5 between the upper and lower slabs 1, 1. The lower part of the first panel assembly 2 is connected with the upper part of the second panel assembly 4 in such a manner that they may be displaced vertically and transversely (horizontally in parallel to the building body) relative to each other. Further, the lower part of the second panel assembly 4 is connected with the upper part of the first panel assembly 2 in such a manner that they may be displaced vertically and transversely (horizontally in parallel to the building body) relative to each other.

Figure 1:
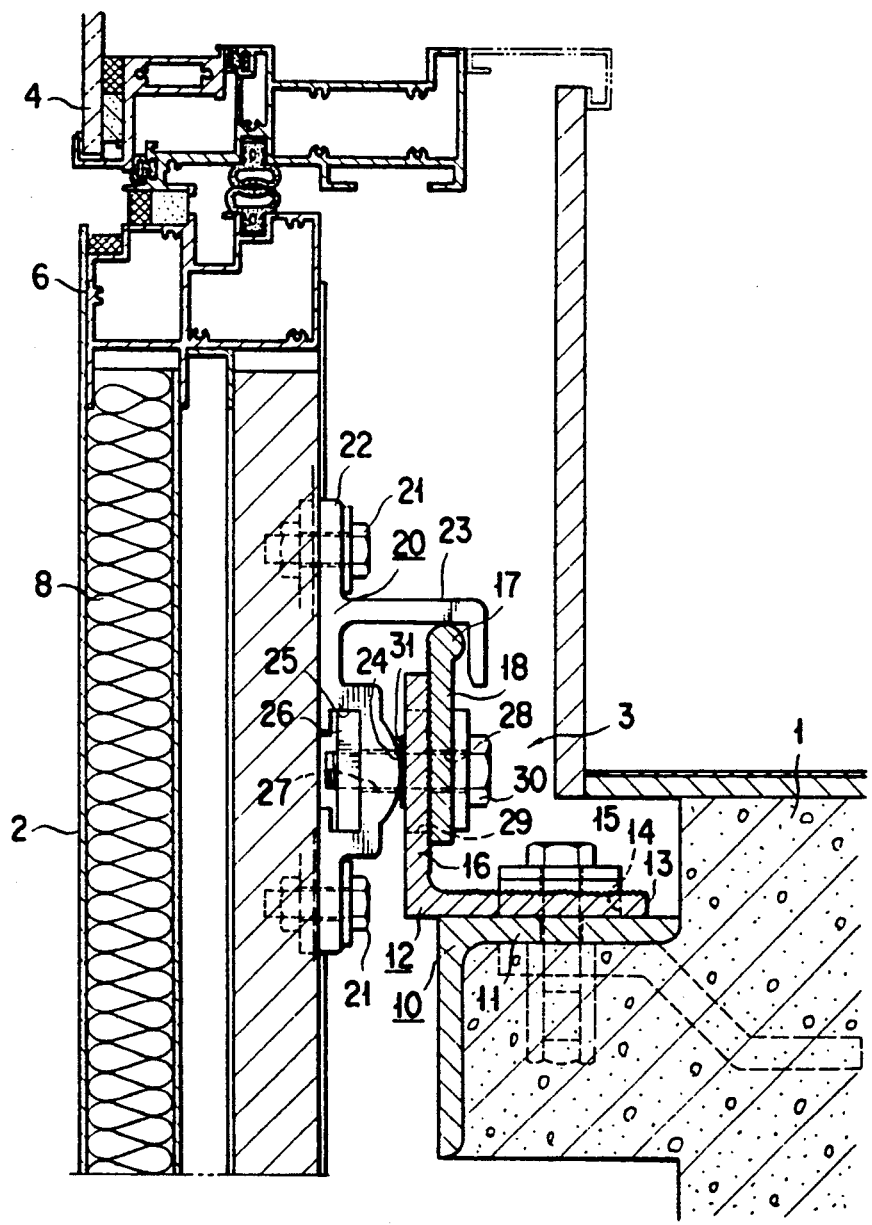
FIGS. 1, 2 and 3 are a vertical sectional view, a horizontal sectional view, and a perspective view, respectively, showing principal parts on which a first panel assembly is mounted.
Figure 2:
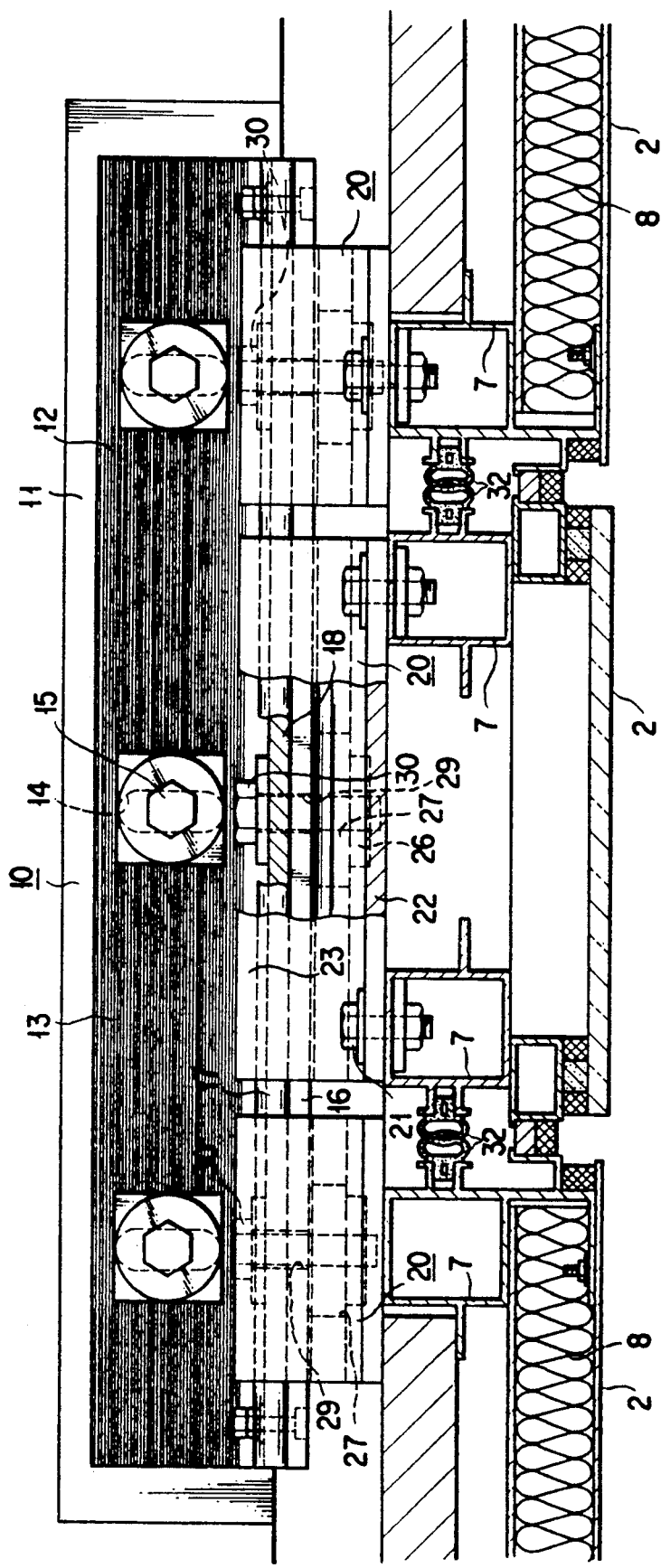
Figure 3:
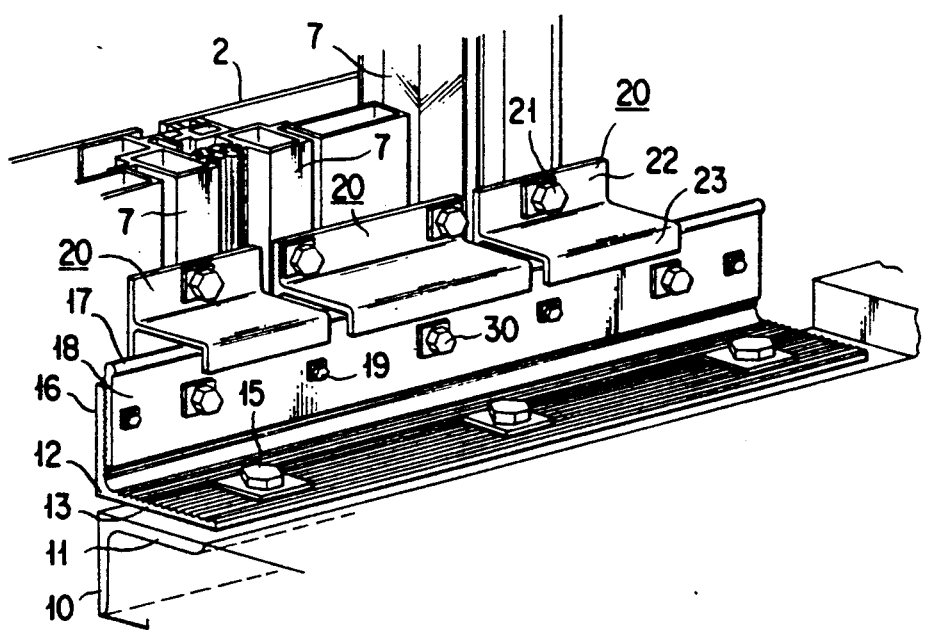

The above-mentioned first fastener means 3 is constructed as shown in FIGS. 1, 2 and 3.

Stating in brief, a primary fastener 10 which is comprised of a long member having an L-shaped section is fixedly secured to the slab 1. Further, a horizontal piece 13 of a secondary fastener 12 which is comprised of a long member having an L-shaped section is connected with a horizontal piece 11 of the primary fastener 10 by means of bolts 15, each of which is passed through an elongated through-hole 14 extending in the direction at right angles to the surface of the building body. A height adjusting plate 18, which is comprised of a long plate-shaped member having an upper portion 17 of a rounded cross-section, is temporarily secured to a longitudinal piece 16 of the secondary fastener 12 by means of bolts 19 shown in FIG. 3.

Each of mounting brackets 20 is fixedly secured to the rear surface of the first panel assembly 2 by means of bolts 21. Each of the mounting brackets 20 is comprised of a vertical plate portion 22, and a horizontal plate portion 23 which is integrally formed with the upper part of the vertical plate portion 22 and whose leading end is downwardly bent in a hook shape and projects towards the building body. Further, the vertically intermediate portion of the vertical plate portion 22 is bent generally in a U-shaped configuration to form a projection 24 having a circular-arc shaped vertical section, and a groove 25. A nut number 26 is inserted in the groove 25 from the longitudinal direction thereof in such a manner that it is not allowed to rotate, and, the circular-arc shaped projection 24 has an elongated horizontally extending through-hole 27 formed therein and having openings at both ends.

The horizontal plate portion 23 is allowed to abut against the rounded upper portion 17 of the height adjusting plate 18. Further, each of bolts 30, which is passed through a through-hole 28 formed in the height adjusting plate 18, an elongated, vertically extending bolt insertion hole 29 and the elongated horizontally extending through-hole 27 is threadably engaged with the above-mentioned nut member 26 so that the circular-arc shaped projection 24 of the bracket 20 is pressed against the vertical piece 16 of the secondary fastener 12 at a proper position.

Further, the vertical piece 16 is applied with a washer 31 so that the circular-arc shaped projection 24 can be pressed against the washer 31.

In the above mentioned embodiment, the aforementioned first panel assembly 2 comprises a rail-stile assembly which consists of rails 6 and stiles 7 and on which a heat insulation panel 8 is mounted. The vertical plate portion 22 of each of the mounting brackets 20 is fixedly secured to the stile 7 by means of bolts 21. The primary fastener 10 and the second fastener 12 are mounted over a plurality of first panel assemblies 2. Each of the mounting brackets 20 connected to the stiles 7 is connected with the vertical piece 16 of the secondary fastener 12 by means of the bolt 30. Each pair of transversely adjacent stiles 7, 7 are pressed against each other through a sealing material 32.

Figure 4:
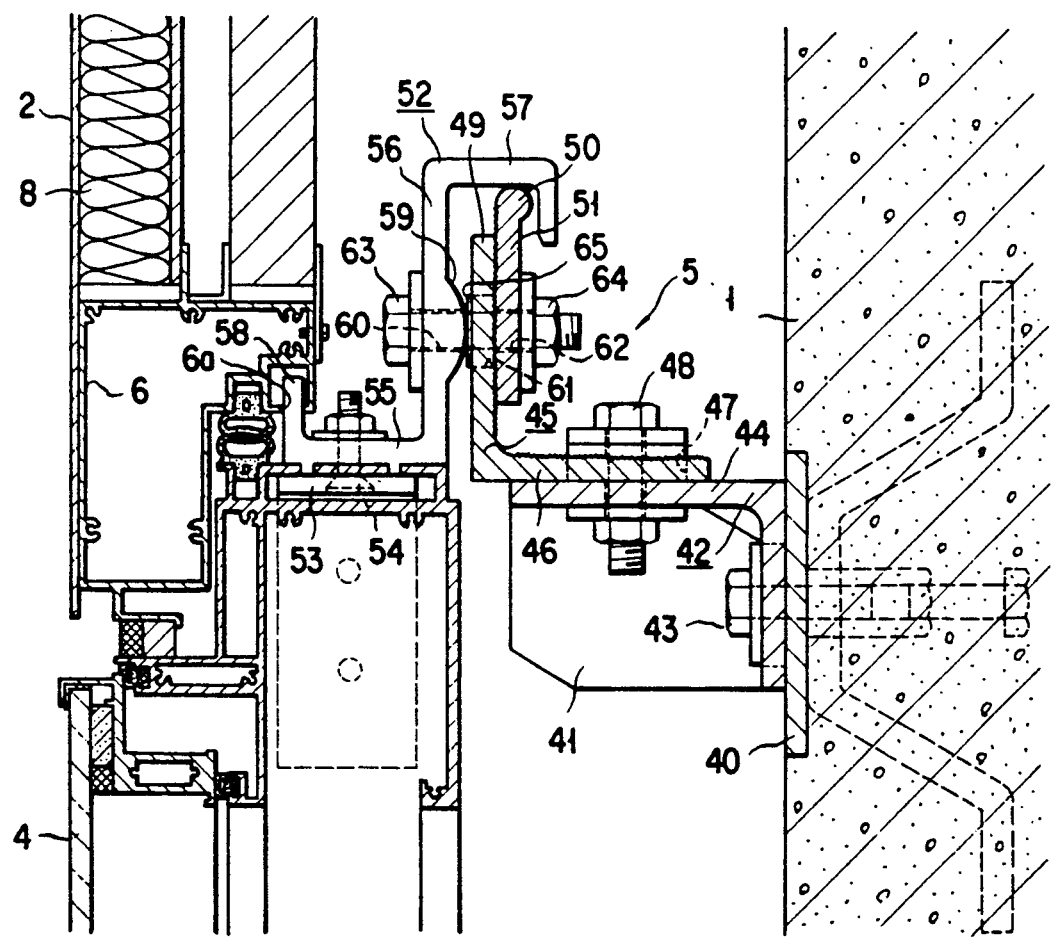
FIGS. 4 and 5 are a vertical sectional view and a horizontal sectional view, respectively, showing principal parts on which a second panel assembly is mounted.
Figure 5:
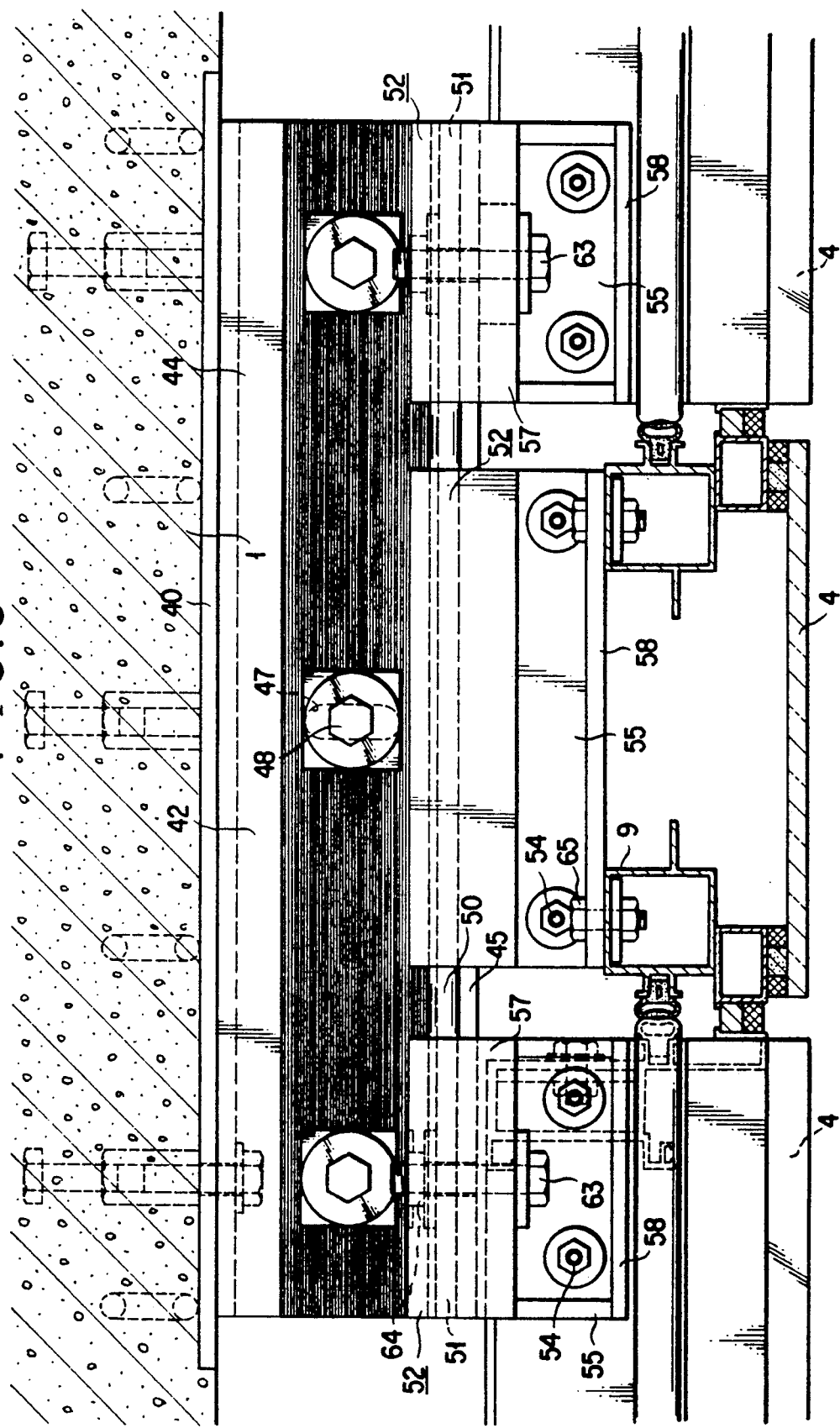

A second fastener means 5 constructed as shown in FIGS. 4 and 5 is described below.

Stating in brief, a primary fastener 42 of an L-shaped section having ribs 41 is fixedly secured to an embedded fastener 40 fixedly secured to a slab 1 by means of bolts 43. Further, a horizontal piece 46 of a secondary fastener 45 having an L-shaped section is connected with a horizontal piece 44 of the primary fastener 42 by means of bolts 48, each of which is passed through an elongated through-hole 47 extending in the direction at right angles to the surface of the building body. Further, a plate-shaped height adjusting plate 51 having a rounded upper portion 50 is temporarily secured to a vertical piece 49 of the secondary fastener 45 by means of bolts 63.

Each of mounting brackets 52 is fixedly secured through a reinforcing member 53 to the upper surface of the second panel assembly 4 by means of bolts 54.

Each of the mounting brackets 52 comprises a generally crank-shaped member which is formed by a mounting plate portion 55, a vertical plate portion 56, and a horizontal plate portion 57 which is downwardly bent in a hook shape. The mounting plate portion 55 has an upstanding plate portion 58 formed integrally therewith, and the vertical plate portion 56 has a projection 59 having a circular-arc shaped section which is formed on the vertically intermediate portion thereof and which has a through-hole 60 formed therein.

The horizontal plate portion 57 is allowed to abut against the circular-arc shaped upper portion 50 of the height adjusting plate 51. Further, each of the bolts 63, which is passed through the through-hole 60, an elongated, vertically extending bolt insertion hole 61 formed in the vertical piece 49, and a through-hole 62 formed in the height adjusting plate 51, is threadably engaged with a nut 64 so that the circular-arc shaped projection 59 of each of the mounting brackets 52 is pressed against a washer 65 applied to the vertical piece 49 of the secondary fastener 45.

The upstanding portion 58 of each of the above-mentioned mounting brackets 52 is fitted in a downward recess 6a formed in the rail 6 of the first panel assembly 2 so that the lower part of the first panel assembly 2 is connected with the upper part of the second panel assembly 4 in such a manner that they may be displaced vertically and transversely (horizontally in parallel to the building body) relative to each other.

Further, as shown in FIG. 5, the upstanding plate portion 58 of the mounting bracket 52 which is located at a transversely central position is connected with the stiles 9 forming part of the second panel assembly 4 by means of bolts 65.

It is to be understood that the foregoing description is merely illustrative of preferred embodiments of the present invention, and that the scope of the invention is not to be limited thereto, but is to be determined by the scope of the appended claims.

What is claimed is:

1. An arrangement for mounting panel assemblies on a body of a building, comprising:
   (a) a primary fastener fixedly secured to a slab of the building body by means of bolts;
   (b) a secondary fastener connected with said primary fastener thorugh a horizontal piece thereof in such a manner that its position may be adjusted in a direction perpendicular to the building body;
   (c) a height adjusting plate having an upper part of a circular-arc shaped vertical section and fixedly secured to a vertical piece of said secondary fastener in such a manner that its vertical position may be adjusted; and
   (d) mounting brackets fixedly secured to rear surfaces of the panel assemblies, each of the mounting brackets including a vertical plate portion having a projection of a circular-arc shaped vertical plate section formed substantially in an intermediate portion thereof, and a horizontal plate portion integrally formed with and projecting from an upper part of the vertical plate portion towards the building body, said horizontal plate portion having a downwardly bent piece formed integrally therewith at a leading end thereof, wherein said mounting brackets and said secondary fastener are interconnected so that lower surfaces of the horizontal plate portions of said mounting brackets abut against the circular-arc shaped upper portion of said height adjusting plate, and wherein the circular-arc shaped projections of the mounting brackets abut against the vertical piece of said secondary fastener thereby mounting said panel assemblies on the building body.

2. An arrangement for mounting panel assemblies on the body of a building as claimed in claim 1, wherein said secondary fastener comprises a long member having an L-shaped section, said horizontal piece of said second fastener having bolt insertion holes formed therethrough and extending in a direction at right angles to a surface of the building body, said vertical piece of said second fastener having elongated bolt insertion holes formed therethrough and extending in a direction parallel to a surface of the building body.

3. An arrangement for mounting panel assemblies on the body of a building as claimed in claim 1, wherein a washer is located between the vertical piece of said secondary fastener and the circular-arc shaped projection of each of said mounting brackets such that the circular-arc shaped projection is pressed against the washer.

* * * * *

UNITED STATES PATENT AND TRADEMARK OFFICE
CERTIFICATE OF CORRECTION

PATENT NO. : 5,158,392

DATED : October 27, 1992

INVENTOR(S) : Akihiko TAKEDA

It is certified that error appears in the above-identified patent and that said Letters Patent is hereby corrected as shown below:

On the title page, item:

[30] "63-10235 [U]" should read --63-102351 [U] -- as the priority document.

Signed and Sealed this

Ninth Day of November, 1993

Attest:

BRUCE LEHMAN

Attesting Officer

Commissioner of Patents and Trademarks